United States Patent Office 3,337,413
Patented Aug. 22, 1967

3,337,413
SOLID HYDROCARBON FERMENTATION PROCESS
Gene H. Wegner, Bartlesville, Okla., assignor to Phillips Petroleum Company, a corporation of Delaware
No Drawing. Filed May 7, 1964, Ser. No. 365,800
10 Claims. (Cl. 195—28)

This invention relates to an improved process for the fermentation of hydrocarbons. In another aspect, this invention relates to a hydrocarbon fermentation process utilizing normally solid hydrocarbons.

It is known in the art that hydrocarbons can be fermented by microorganisms with the production of hydrocarbon-soluble products and/or water-soluble products. Normally solid hydrocarbons are often preferred in fermentation processes. However, those hydrocarbons which are solids at fermentation temperatures and which can be utilized by micro-organisms in fermentation processes are difficult to disperse in the fermentation system. As a result, fermentation of solid hydrocarbons is a slow process as the hydrocarbons are not in a form readily available for attack by the micro-organisms. An additional disadvantage of utilizing solid hydrocarbons in fermentation processes is that the said solid hydrocarbons cannot be readily pumped or otherwise transmitted to or through the fermentation system.

Accordingly, an object of my invention is to provide an improved hydrocarbon fermentation process.

Another object of my invention is to provide a hydrocarbon fermentation process utilizing normally solid hydrocarbons.

Other objects, advantages and features of my invention will be readily apparent to those skilled in the art from the following description and the appended claims.

By my invention, I have provided a fermentation process wherein a normally solid hydrocarbon is solubilized in a liquid hydrocarbon of different chemical structure and the liquid hydrocarbon containing the normally solid hydrocarbon is employed in a hydrocarbon fermentation process.

In the hydrocarbon fermentation process of my invention, hydrocarbon-utilizing micro-organisms are placed in an aqueous mineral salts medium. Hydrocarbon-utilizing micro-organisms include yeasts, molds and bacteria. Suitable bacteria include Eubacteriales, Actinomycetales, Chlamydobacteriales, Myxobacteriales, and Spirochaetales. The micro-organisms are cultured in various mixtures of mineral salts dissolved in distilled water and with a normally solid hydrocarbon as a carbon source. Generally, a suitable aqueous medium should have (a) a balanced mineral content, (b) a nitrogen source such as ammonium or nitrate ions, (c) oxygen, and (d) a pH near neutrality. Exceptions are known to each of these conditions. Attention is directed to Petroleum Microbiology by Beerstecher, Elsevier Press, Incorporated (1954), for a more complete discussion of suitable mineral salt media.

The hydrocarbons employed in the fermentation process of my invention are those hydrocarbons normally solid at the fermentation temperature and capable of being utilized by micro-organisms in fermentation processes. These normally solid hydrocarbons include straight, branched and cyclic saturated and unsaturated hydrocarbons. The saturated straight chain hydrocarbons having at least 20 carbon atoms per molecule are preferred.

In accordance with my invention, the normally solid hydrocarbon is solubilized by placing the said normally solid hydrocarbon in a liquid hydrocarbon solvent of different chemical structure, thereby providing a means whereby the normally solid hydrocarbon can be readily handled, emulsified and fermented. Although it is within the scope of this invention to utilize a liquid hydrocarbon that undergoes extensive fermentation in the fermentation process, it is normally preferred that the liquid hydrocarbon solvent be of such a molecular structure as to be relatively resistant to attack by the particular species of micro-organisms utilized. In this way, the liquid hydrocarbon solvent acts as an inert carrier for the solid hydrocarbon undergoing fermentation. In some circumstances, it may be permissible, or even desirable, that the liquid hydrocarbon component, as well as the normally solid hydrocarbon, undergo fermentation. Suitable liquid hydrocarbon solvents include aromatic hydrocarbons, and straight, branched and cyclic saturated and unsaturated hydrocarbons liquid at the fermentation temperature.

In the hydrocarbon fermentation process, the selected hydrocarbon-utilizing micro-organisms are placed in a suitable aqueous medium. The liquid hydrocarbon solvent containing the normally solid hydrocarbon can then be placed on the surface of the aqueous medium, forming a hydrocarbon-aqueous medium interface.

In a second embodiment of the invention, the liquid hydrocarbon solvent containing the normally solid hydrocarbon can be circulated through the aqueous medium containing the hydrocarbon-utilizing micro-organisms.

In a third embodiment, the aqueous medium containing the hydrocarbon-utilizing micro-organisms can be circulated through the liquid hydrocarbon solvent containing the normally solid hydrocarbon.

In yet a fourth embodiment, an emulsion of the liquid hydrocarbon solvent containing the normally solid hydrocarbon and the aqueous medium can be maintained throughout the fermentation process.

Temperatures employed in the fermentation process normally range from about 20° C. to about 50° C., although temperatures outside this range can be employed. Generally, fermentation processes are conducted at about 37° C.

Products of the fermentation process include acids, alcohols, ketones, esters, aldehydes and proteins. For example, paraffin hydrocarbons are converted to proteins, alcohols, aldehydes, ketones, acids and ester waxes. The fermentation products are normally distributed in both hydrocarbon phase and the aqueous medium, with the concentration in the respective phases depending upon the particular fermentation products produced and their specific distribution coefficients. Products of the fermentation process can be separated from the hydrocarbon and aqueous phases by conventional methods.

It is within the scope of this invention to separate the liquid hydrocarbon phase from the aqueous medium, recover the fermentation products from the separated hydrocarbon phase and recycle the liquid hydrocarbon solvent to the fermentation process with additional normally solid hydrocarbon added thereto.

The following example is presented to demonstrate the objects and advantages of the invention. It is not intended that the invention should be limited to the specific embodiments presented therein.

*Example*

In this example, runs were conducted to demonstrate the increased rate at which protein is produced by fermentation of eicosane dissolved in a liquid hydrocarbon as compared with the rate of protein production in the fermentation of eicosane as the solid.

The hydrocarbon liquid solvents employed in the fermentation runs were decane, a propane-dewaxed lubricating oil having a viscosity of 93.59 SUS at 100° F., a Cleveland open cup flash of 395° F. and an API gravity of 33.4, and Decalin. The fermentation runs were conducted with a pure yeast culture which grows well on $C_{12}$ to $C_{20}$ n-paraffinic hydrocarbons, but not on decane or Decalin. The culture employed in these experiments have been grown on eicosane. An aqueous mineral salts medium containing the following amounts of salts dissolved in each liter of solution was prepared:

| Salt: | Conc., g./l. |
|---|---|
| $KH_2PO_4$ | 3 |
| $(NH_4)_2HPO_4$ | 2 |
| $NH_4NO_3$ | 1 |
| $MgSO_4 \cdot 7H_2O$ | 0.4 |
| $MnCl_2 \cdot 4H_2O$ | 0.002 |
| $FeSO_4 \cdot 7H_2O$ | 0.02 |
| $CaCl_2$ | 0.02 |
| $CuSO_4 \cdot 5H_2O$ | 0.002 |
| $ZnCl_2$ | 0.002 |

In each run, one ml. of the liquid hydrocarbon solvent was added to 50 ml. of the mineral salts medium in a 250-ml. flask. In those runs in which the normally solid hydrocarbon eicosane was dissolved in a hydrocarbon solvent, the 1 ml. of solution employed contained 50 percent by weight of eicosane and an equal weight of liquid solvent. The mixture of liquid hydrocarbon and mineral salts medium was inoculated with 0.5 ml. of the yeast culture and then shaken at 200 r.p.m. for 48 hours at 28–30° C. The extent of the yeast growth was then determined by protein analysis by the method of Lowry and co-workers, Journal of Biological Chemistry, 193, 265–275 (1951).

The quantity and results obtained for each of the runs from the fermentation of eicosane, decane, the propane-dewaxed lubricating oil, and certain mixtures thereof were as follows:

| Run No. | Hydrocarbon | Protein in Culture, grams/liter |
|---|---|---|
| 1 | Decane | 0.02 |
| 2 | Eicosane | 0.06 |
| 3 | Dewaxed lube oil | 0.26 |
| 4 | Decane plus eicosane | 1.00 |
| 5 | Dewaxed lube oil plus eicosane | 1.84 |

In the fermentation of a 1:1 mixture of Decalin and eicosane, shaken at 28–30° C., a heavy growth of yeast was observed after five days. When subjected to comparable conditions, Decalin in the absence of eicosane produced no yeast growth, and eicosane alone yielded only a poor growth of yeast.

The above results clearly demonstrate the increased rate at which protein is produced by the fermentation of a normally solid hydrocarbon when the solid hydrocarbon is dissolved in the liquid hydrocarbon relatively resistant to attack by the micro-organisms used.

As will be evident to those skilled in the art, various modifications of this invention can be made, or followed, in the light of the foregoing disclosure, without departing from the spirit or scope thereof.

I claim:

1. A hydrocarbon fermentation process which comprises dissolving a normally solid hydrocarbon in a normally liquid hydrocarbon, continuously contacting an aqueous nutrient medium containing hydrocarbon-utilizing micro-organisms with said normally liquid hydrocarbon having dissolved therein said normally solid hydrocarbon, fermenting said solid hydrocarbon with said micro-organism under conditions suitable for fermentation, and recovering the fermented product.

2. A hydrocarbon fermentation process which comprises dissolving a normally solid hydrocarbon in a normally liquid hydrocarbon, continuously dispersing said normally liquid hydrocarbon having dissolved therein said normally solid hydrocarbon through an aqueous nutrient medium containing hydrocarbon-utilizing micro-organisms, fermenting said solid hydrocarbon with said micro-organism under conditions suitable for fermentation, and recovering the fermented product.

3. A hydrocarbon fermentation process which comprises dissolving a normally solid hydrocarbon in a normally liquid hydrocarbon, dispersing an aqueous nutrient medium containing hydrocarbon-utilizing micro-organism through said normally liquid hydrocarbon solvent having dissolved therein said normally solid hydrocarbon, fermenting said solid hydrocarbon with said micro-organism under conditions suitable for fermentation, and recovering the fermented product.

4. The process of claim 2 wherein said normally solid hydrocarbon is a normal paraffin having at least 20 carbon atoms per molecule.

5. The process of claim 4 wherein said hydrocarbon-utilizing micro-organism is a pure yeast culture.

6. The process of claim 5 wherein said normally liquid hydrocarbon is selected from the group consisting of decane, Decalin and a propane-dewaxed lubricating oil.

7. A hydrocarbon fermentation process which comprises dissolving a normally solid hydrocarbon in a normally liquid hydrocarbon, continuously contacting an aqueous nutrient medium containing hydrocarbon-utilizing micro-organisms with said normally liquid hydrocarbon having dissolved therein said normally solid hydrocarbon in a fermentation zone, fermenting said solid hydrocarbon with said micro-organism in said fermentation zone under fermenting conditions, recovering said normally liquid hydrocarbon from said fermentation zone, dissolving additional normally solid hydrocarbon in said normally liquid hydrocarbon recovered from said fermentation zone, recycling the resultant normally liquid hydrocarbon having dissolved therein the normally solid hydrocarbon to said fermentation zone, and therein fermenting said solid hydrocarbon with said micro-organism.

8. A process according to claim 2 wherein said normally liquid hydrocarbon is not susceptible to fermentation by said micro-organisms.

9. A hydrocarbon fermentation process which comprises dissolving eicosane in a normally liquid hydrocarbon solvent selected from the group consisting of decane, decalin and a propane dewaxed lubricating oil, passing said solution to a fermentation zone containing an aqueous nutrient mineral salt medium containing a pure yeast culture, agitating said mixture of hydrocarbon and aqueous nutrient medium at a temperature of 28 to 30° C. for a sufficient time to cause substantial fermentation of said eicosane by said nutrient medium, and separating said fermented product from said hydrocarbon solvent and said aqueous nutrient medium.

10. A hydrocarbon fermentation process according to claim 9 wherein said normally liquid hydrocarbon solvent is decane.

References Cited

UNITED STATES PATENTS

| 3,131,131 | 4/1964 | Wehner | 195—3 |
| 3,259,549 | 7/1966 | Vernet et al. | 195—3 |

OTHER REFERENCES

Beerstecher: Petroleum Microbiology, Elsevier Press Inc., New York, p. 191 (1954).

Zobell: Advances in Enzymology, vol. X, pp. 444 to 449.

A. LOUIS MONACELL, *Primary Examiner.*

ALVIN E. TANENHOLTZ, *Examiner.*